United States Patent [19]
Tyson

[11] Patent Number: 4,706,643
[45] Date of Patent: Nov. 17, 1987

[54] GRILL MEANS

[76] Inventor: William H. Tyson, Rte. 8, Box 53, Greenville, N.C. 27834

[21] Appl. No.: 937,921

[22] Filed: Dec. 4, 1986

Related U.S. Application Data

[63] Continuation-in-part of Ser. No. 744,955, Jun. 17, 1985, Pat. No. 4,638,787.

[51] Int. Cl.[4] .............................................. A47J 37/00
[52] U.S. Cl. ................................ 126/25 R; 126/25 B; 126/245; 126/39 R; 126/36
[58] Field of Search ...................... 126/38, 41 R, 39 R, 126/9 R, 25 R, 25 A, 25 AA, 36

[56] References Cited

U.S. PATENT DOCUMENTS

| | | | |
|---|---|---|---|
| 3,295,509 | 1/1967 | Harvey | 126/36 |
| 3,688,757 | 9/1972 | Dusek | 126/9 R |
| 3,765,397 | 10/1973 | Henderson | 126/9 R |
| 4,233,890 | 11/1980 | Jansen | 126/25 R |
| 4,638,787 | 1/1987 | Tyson | 126/25 R |

*Primary Examiner*—James C. Yeung
*Attorney, Agent, or Firm*—Mills & Coats

[57] ABSTRACT

This invention is a grill of the type ordinarily associated with charcoal. Such grill features sloped heat reflecting sides which create smoke but will not flame up, an elongated thin, centrally disposed charcoal basket is also provided with a clean out tray therebelow. Additionally, a charcoal igniting chamber is provided which allows the charcoal to be lit through the use of newspaper type combustibles thus eliminating the need for charcoal lighter fluid and similar ignitors.

6 Claims, 6 Drawing Figures

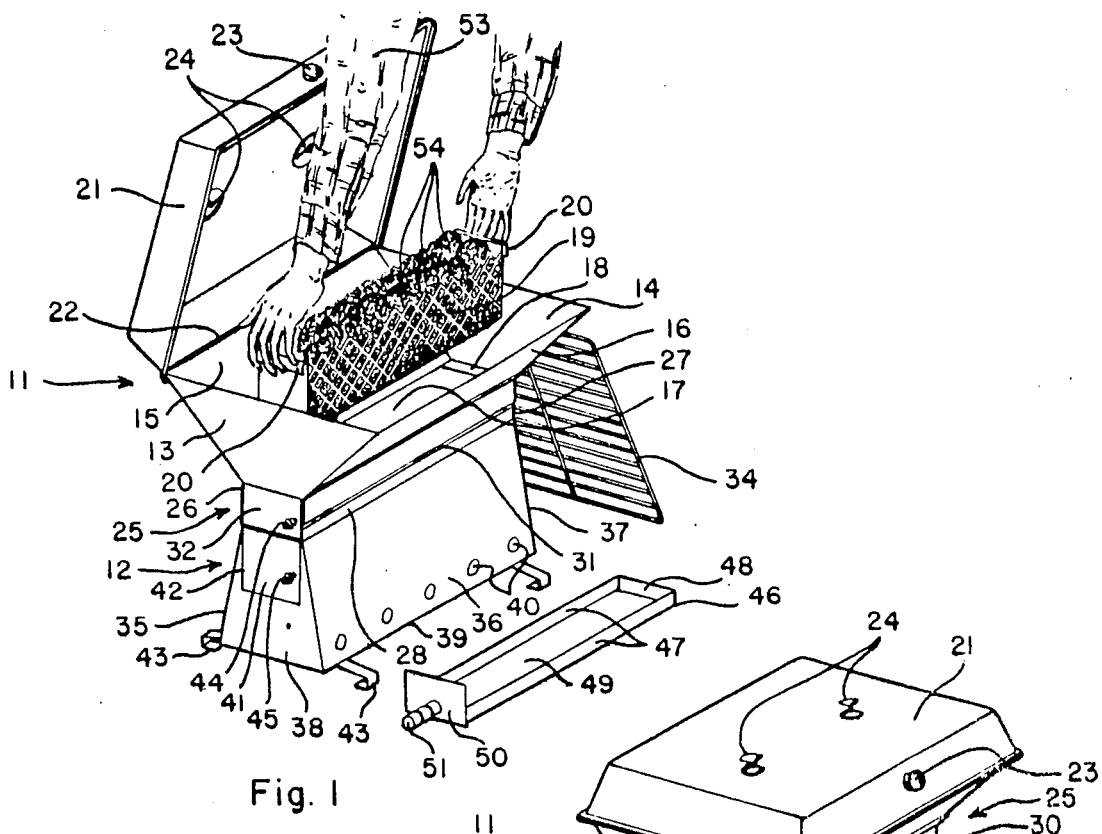
Fig. 1
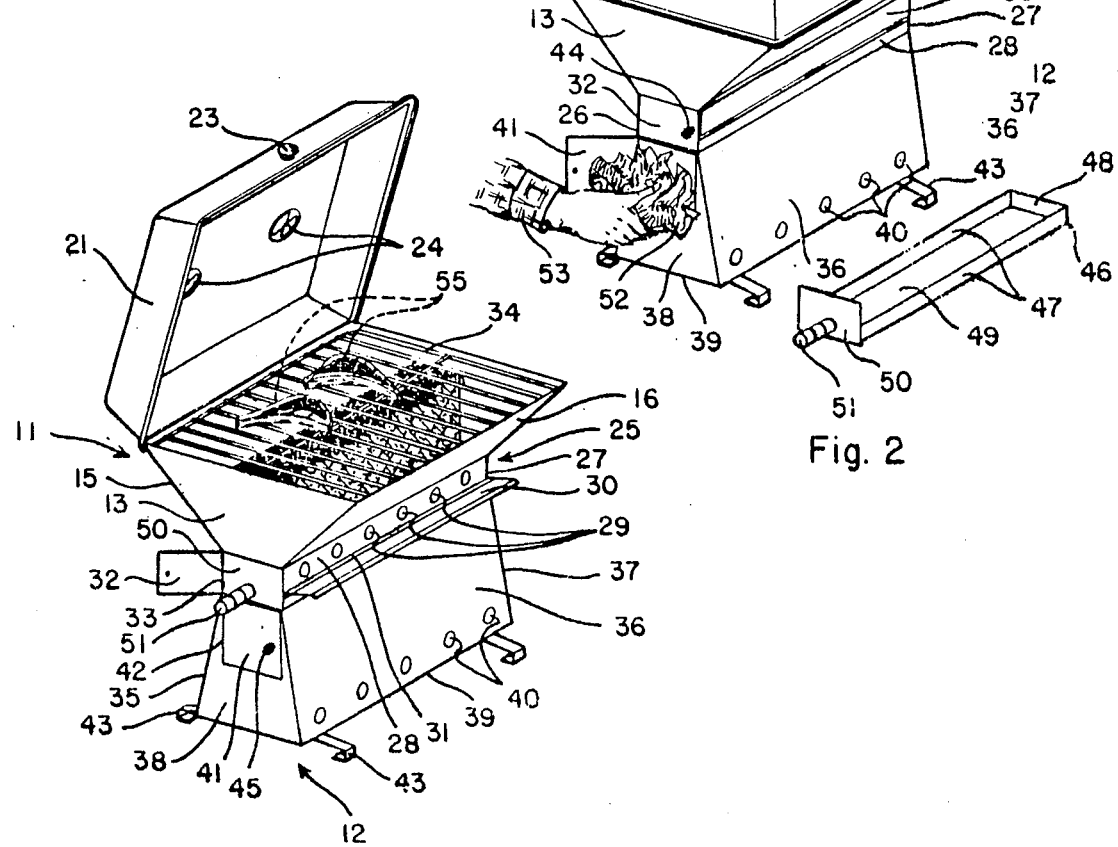
Fig. 2
Fig. 3

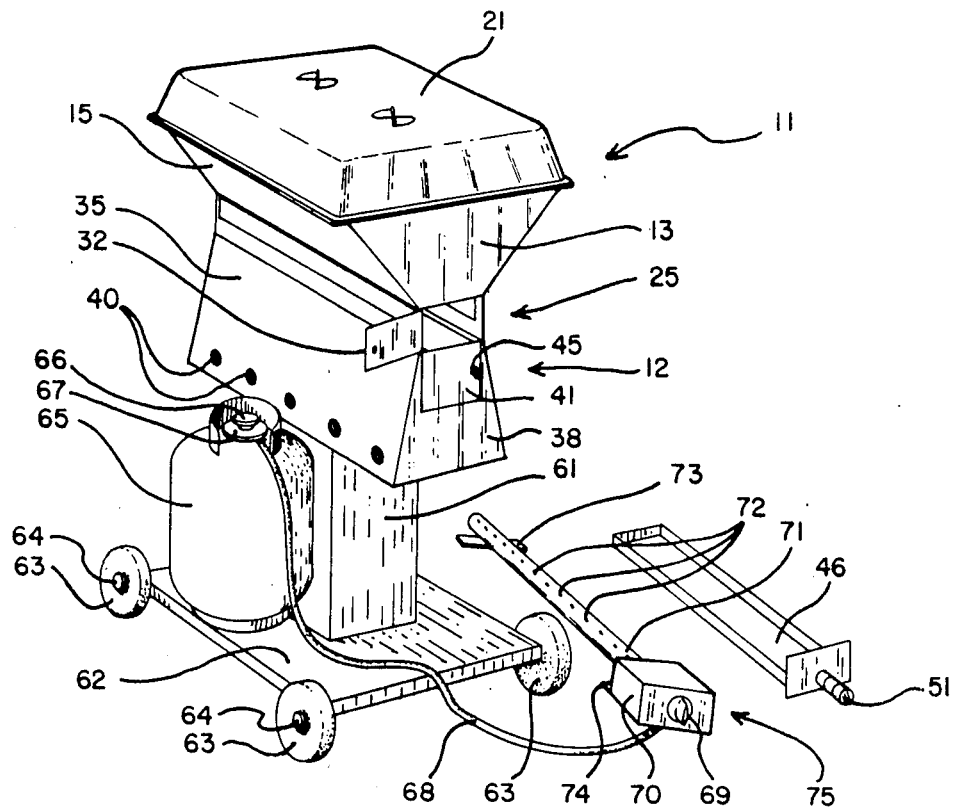
Fig. 4
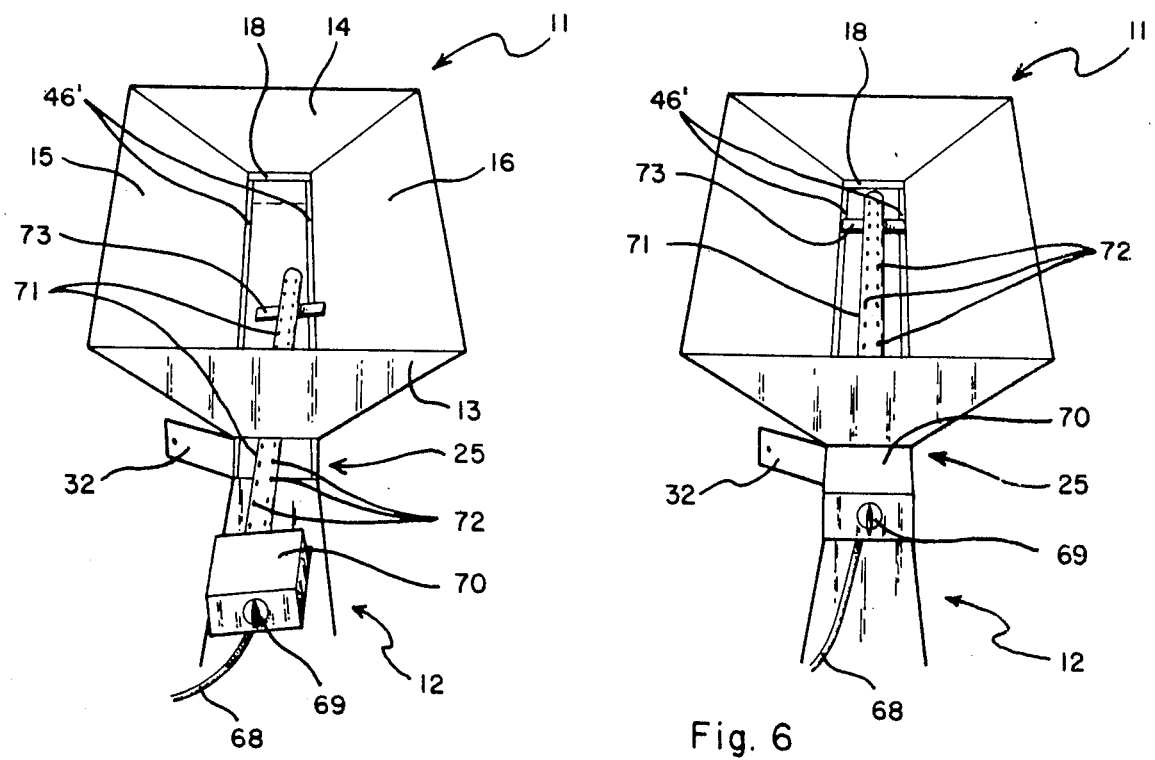
Fig. 5
Fig. 6

GRILL MEANS

This is a continuation in part of U.S. patent application Ser. No. 744,955, filed June 17, 1985, U.S. Pat. No. 4,638,787.

FIELD OF INVENTION

This invention relates to cooking means and more particularly to charcoal type grills.

BACKGROUND OF INVENTION

Since ancient times, people have used fires for cooking meals outside. These have ranged from campfires to hibachis and more recently various types of uncovered and covered outdoor type charcoal grills.

Not only the method of cooking but the lighting of the fire itself has always been a problem that has had to be contended with. In more modern times, with the popularity of outdoor cooking of fish, chicken, steaks, and the like, the most troublesome problems have continued to be the starting of the fire to create the coals for cooking and dealing with flame flare-ups during cooking.

To overcome the fire starting problem, gas grills have been introduced with briquet shaped lava type rocks to simulate cooking over charcoal. This alternative, in an attempt to get away from lighting problems, has two main drawbacks, first they are expensive, and secondly they do not impart the flavor to the food being cooked that the use of hardwood charcoal gives.

The use of lighter fluids, which are usually petroleum distillates, invariably leaves a residual taste, has a bad odor when burning, and cannot be used until all of the briquets have been completely ignited and turn ash white due to the volatile odors being emitted therefrom. Electric ignitors have been marketed but these devices invariably burn out after a short time and have to be replaced which is both aggravating and expensive.

Finally, cylindrical shaped devices have been used wherein newspaper or similar material is placed in the bottom thereof with charcoal in the upper portion. When the paper is lit it will ignite the bottom layer of the charcoal thus eventually igniting the remainder. Although these ignitors do not leave residual odors, they are offensive in giving off large amounts of smoke when first ignited, tend to eventually burn out, and most importantly, are dangerous in that the charcoal must be transferred from the ignition to the grill and then the ignitor placed somewhere that it will not burn or create a fire until it has cooled off. There is also the danger of a child or other person touching the hot cylinder and becoming badly burned thereby.

BRIEF DESCRIPTION OF INVENTION

After much research and study into the above-mentioned problems, the present invention has been developed to provide a charcoal type cooking device which is easy to ignite, is highly efficient in cooking, and does not have extended fire flame-ups during use.

The above is accomplished through the provision of a relatively narrow charcoal basket extending across the grill with an ash clean-out means thereunder. The bottom of the grill is also sloped inwardly to a point adjacent the basket to reflect heat and prevent extended flame-ups.

Below the clean-out tray is an elongated ignitor section which is adapted to receive newspapers or similar combustible material which is used to ignite the charcoal thereabove. Since the ignitor portion of the present invention is integral with the grill, no transfer of the briquets is required. Further, since the bottom is sloped with the charcoal contained within a relatively narrow but elongated basket, grease and other liquids dripping from the food being cooked will flash either on the sloped bottom or on the briquets themselves but will not maintain continuous combustion or flame which causes so many burned steaks and other food products when using conventional charcoal type grills.

Since the clean-out pan is disposed beneath the briquets during the cooking process, ashes can be collected therein and readily dumped at a convenient time and location without having to pick the grill up or otherwise manipulate the same during the cleaning process as has heretofore been necessary.

In view of the above, it is an object of the present invention to provide a charcoal type grill which is self-igniting, prevents extended flame flare-ups, and can be readily cleaned.

Another object of the present invention is to provide and improved container for charcoal type fuel which allows maximum cooking with a minimum of fuel.

Another object of the present invention is to provide, in a charcoal type grill, an integral means for igniting the charcoal.

Another object of the present invention is to provide a charcoal type grill having a combination of relatively narrow fuel basket and steeply sloped sides to prevent food from burning.

Another object of the present invention is to provide an extremely fuel efficient charcoal type grill.

Other objects and advantages of the present invention will become apparent and obvious from a study of the following description and the accompanying drawings which are merely illustrative of such invention.

BRIEF DESCRIPTION OF DRAWINGS

FIG. 1 is a perspective view of the various parts of the improved grill means of the present invention;

FIG. 2 is a perspective view showing a paper type combustible being placed in the ignitor portion of the present invention;

FIG. 3 is a perspective view of the grill means ready for cooking;

FIG. 4 is a perspective view of a gas fired version of the present invention;

FIG. 5 is a top end perspective view of the gas adapter being placed in the collar portion of the present invention;

FIG. 6 is a top end perspective view of the gas adapter in place.

DETAILED DESCRIPTION OF INVENTION

With further reference to the drawings, the improved grill means of the present invention, indicated generally at 10, is composed of a grill portion, indicated generally at 11, and an ignitor portion, indicated generally at 12.

The grill portion 11 is composed of generally vertically disposed end walls 13 and 14 and steeply sloping sidewalls 15 and 16. The lower periphery of the end walls and side walls define an elongated opening 17. Charcoal basket support shoulders 18 are provided at opposite ends of the elongated opening 17 and are adapted to supportingly engage charcoal basket 19.

The sides and bottom of the charcoal basket 19 are preferably constructed from expanded metal. Since metal of this type is well known to those skilled in the art, further detailed discussion of the same is not deemed necessary.

Handle means 20 are provided on either end of charcoal basket 19 so that the same can be readily lifted from the grill means for cleaning or other purposes.

The charcoal basket 19 is approximately two charcoal briquets wide thus presenting only a narrow area of direct radiation immediately above said basket during cooking.

A smoke cover 21 is hingedly mounted to the upper edge of side wall 15, as indicated at 22. A lifting handle 23 is provided on the side of smoke cover 21 opposite hinge 22.

Rotatable exhaust dampers 24 are provided in the top of smoke cover 21. Since rotatable exhaust dampers of this type are well known to those skilled in the art, further detailed discussion of the same is not deemed necessary.

A collar portion, indicated generally at 25, connects the grill portion 11 to the ignitor portion 12 of the grill means 10 of the present invention. This collar portion includes an impervious side 26, an impervious end 27, and a side 28 having a plurality of draft openings 29 therein. A draft damper 30 is hingedly mounted, as indicated at 31, to side 28 of collar portion 25 and can be used to close damper openings 29 as shown in FIGS. 1 and 2 and can be opened the same to allow air to flow through said draft openings 29 as shown in FIG. 3.

The collar door 32 is hingedly mounted, as indicated at 33, and forms the second end of such collar and yet gives access to the interior thereof as will hereinafter be described in greater detail.

Food supporting grill 34 is so sized as to snugly fit in the top of grill portion 11 as can clearly be seen in FIG. 3. The grill 34 can either rest on and be supported by the sloping sidewalls 15 and 16 or can have separate support means (not shown) and can even be height adjustable. It has been found through use, however, that height adjustment is not necessary due to the unique cooking characteristics of the present invention.

The ignitor portion 12 of the present invention includes side walls 35 and 36, end walls 37 and 38, and bottom 39. The top of the ignitor portion is, of course, open where it joins collar portion 25.

End wall 38 and bottom 39 of ignitor portion 12 are impervious. Each of the side walls 35 and 36 has a plurality of draft openings 40 in the lower portion thereof and end wall 37 has an access door 41 therein which is hingedly mounted as indicated at 42.

Heat insulating support legs 43 are fixedly secured to bottom 39 of ignitor portion 12 while manipulating handle 44 is provided on collar door 32 and a manipulating handle 45 is provided on ignitor access door 41.

Clean-out tray 46 is composed of side walls 47, end wall 48, bottom 49, and end wall cover plate 50. Cover plate/end wall 50 has a manipulating handle 51 outwardly extending therefrom.

The clean-out tray 46 is so sized as to slide into collar portion 25, and when in place, end wall 50 will cover the opening left when collar door 32 is open as can clearly be seen in FIG. 3. Since this tray effectively covers the horizontal cross section of collar portion 25, it blocks any draft entering draft openings 40 of the ignitor portion 12 from passing into the grill portion 11.

To use the improved grill means of the present invention, the smoke cover 21 is opened and the charcoal basket 19 is filled with charcoal 54, preferably in the form of briquets, to the desired level depending on the anticipated time of cooking. The longer the cooking time, of course, the more charcoal would be used. During this filling process the charcoal basket 19 is resting on shoulders 18 over elongated opening 17 and such basket does not have to be removed from the grill means during such filling.

The clean-out tray 46 is removed from collar portion 25 and collar door 32 is closed. Draft damper 30 is also closed. Access door 41 is opened and non-toxic combustible materials 52 such as crumpled up newspaper can be placed inside of the ignitor portion 12. The equivalent of three to five sheets of newspaper have been found to be adequate for the igniting purpose.

Door 41 is closed after the newspaper has been inserted. Since it is desirable to have the combustible material burn from the bottom, a match or other igniting means is passed through one of the draft openings 41 to light the newspaper or other combustible material.

As the paper or other combustibles 52 begins to burn, the tapered side walls 35 and 36 funnel the fire into the collar portion 25 which has exposed thereabove the charcoal 54 in basket 19. An updraft or chimney effect is created which causes rapid burning of material 52 which quickly ignites not only the bottom layer of charcoal, but since the flames can pass around the charcoal briquets and the basket 19 is of the open mesh type, a good portion of the side briquets also are ignited. Within a few minutes, usually between eight and twelve minutes, the entire basket of briquets will have become ignited and the grill means 10 of the present invention is ready to use.

Once the charcoal 54 within basket 19 is ready to use as indicated above, collar door 32 is opened and clean-out tray 46 is inserted. This cuts off the updraft from the ignitor portion Draft damper 30 is opened as are exhaust dampers 24. The food 55 to be grilled is placed on cooking rack 34 and smoking cover 21 is closed. The air for sustaining combustion of the charcoal enters draft openings 29, passes up through the charcoal 54, and the products of combustion passed out of the grill means 10 through the openings in exhaust dampers 24. By manipulating dampers 24 and/or 30, the temperature within the grill means can be controlled.

Since the greatest portion of charcoal is exposed on the vertical side walls of basket 19, the interior of the steeply sloping walls 15 and 16 quickly become hot. As the food 55 begins to cook, natural essence therefrom will begin to drip down and strike the interior of these walls. This dripping essence will almost instantly vaporize into a puff of smoke.

If the sides are hot enough, the vaporizing smoke may flash but only adjacent the area where the essence contacted the side and will only last for a moment and certainly will not be a sustained flame. Also, due to the very small area where the food 55 is actually disposed directly above the charcoal 54, the small amount of essence falling thereon will smoke and possibly flash, but due to such a small area, there will not be enough essence at any given time to sustain flaming which is so often encountered when using the prior art grills, particularly when cooking meats which can contain a large percentage of fat such as pork, steaks, and particularly hamburgers.

Once the cooking process has been completed, dampers 24 and 30 are closed thus effectively cutting off combustion sustaining air to the smoldering charcoal which will very quickly extinguish the same so that it can be used again.

Once the charcoal has been extinguished, the clean-out tray 46 can be removed from beneath charcoal basket 19 which will remove the ashes that have fallen from the charcoal during the burning process.

The next time it is desired to use the grill means 10 of the present invention, only a few more pieces of charcoal need to be added to bring the volume of the same up to the desired level. The igniting process can then be repeated followed by cooking as described above.

Although part of the food 55 being cooked is often disposed directly above the charcoal, because there is such a small area of direct exposure, overcooking or different rates of cooking have not been problems during extensive experimental use of the grill means of the present invention.

The smoking and momentary flashing of the essence dripping from the food being cooked imparts thereto a delicious flavor not found in foods cooked on prior art grills. Also, the food being cooked can be browned to perfection on the outside while remaining moist and juicy on the inside.

Again, hamburgers which are the jinx of most outdoor cooking due to continuous flame flare-ups and constant burning, are one of the best types of food to cook on the present invention because there is no continuous flame or flame flare-ups but only momentary flashes with taste enhancing smoke. Experiments have been conducted cooking hamburger meat taken from the same package, part on a kettle type prior art grill and part on an improved grill means of the present invention. Whenever, the top of the kettle grill is raised, the entire interior would become a sustained fireball, badly burning the meat on the outside while leaving the interior raw. The meat cooked on the present invention sizzled, flashed, and smoked, but did not flame up and when the exterior of such meat was golden brown, the interior was done and yet remained juicy with an absolutely delicious flavor.

Referring now to the modifications shown in FIGS. 4 through 6, the improved grill means of the present invention is mounted on a pylon 61 which in turn is mounted on a carriage platform 62 and is secured thereto by any suitable means such as weldment.

Wheels 63 are rotatingly mounted on axils 64 which in turn are fixedly secured to platform 62. Since the mounting and operation of wheels of this type are well known to those skilled in the art, further detailed discussion of the same is not deemed necessary.

A standard, commercially available gas tank or reservoir 65 is mounted on platform 62 and includes the normal cut-off valve and gas pressure regulator as indicated at 66 and 67 respectively.

A gas line 68 is operatively connected to regulator 67 in the normal manner of such devices. The opposite end of line 68 from regulator 67 is operatively connected to a burner control 69. This burner control is operatively mounted within housing 70 and operates in the normal manner of such devices.

A burner manifold 71 is operatively connected to burner control 69 and includes a plurality of burner orfaces 72. Adjacent the end of manifold 71 opposite control 69 is fixedly secured flange 73 which acts as both a guide and a support for said manifold as will hereinafter be described in detail.

To use gas rather than charcoal in the present invention, clean-out tray 46 is removed from collar portion 25 and manifold 71 is substituted therefore with manifold flange 73 and housing flange 74 resting on tray slide 46' thus giving a steady mounting to said manifold 71 within collar portion 25. To prevent accumulated grease and/or charcoal ash (if charcoal briquettes are used) from falling into the ignitor portion 12, a tray similar to clean-out tray 46 but without cover plate 50 and handle 51 can be placed on tray slide 46' with manifold flange 73 and housing flange 74 resting on the upper edges of side walls 47.

The basket 19 can be left in place resting on support shoulders 18 adjacent walls 13 and 14 of grill portion 11 since the manifold 71 is disposed therebelow.

Charcoal briquettes 54 can be left in basket 19; can be replaced with lava rocks or stone briquettes; or as a compromise and for maximum cooking efficiency while obtaining maximum charcoal flavor, a mixture of charcoal and stone briquettes can be placed in basket 19.

Once the type of briquettes desired have been placed in basket 19 and the same has been placed in the grill portion 11 as shown in FIG. 3, the gas manifold 71 is ready to light. By simply pulling the manifold with it's control and control housing out to approximately the point shown in FIG. 5, some of the orfaces 72 will be exposed outside of collar portion 25. Cut-off valve 66 can then be opened, control 69 manipulated to turn on the gas. As such gas exits orfaces 72, it can be lit with any convenient means such as a match (not shown). The manifold assembly 75 can then be slid back into collar portion 25 to the position shown in FIG. 6. Food 55 can then be placed on the cooking rack of grill 34 and the cooking process accomplished in the normal manner.

If some or all charcoal briquettes are used in the gas cooking operation, once such cooking has been completed, the manifold assembly 75 can be removed from the collar portion 25 and clean-out tray 46 can be used to replace the same. The charcoal basket can then be vibrated or shaken to cause the charcoal briquette ashes to fall into tray 46. Such tray can then be removed as earlier described and ashes discarded.

If of course, only volcanoe rock or stone briquettes are used, then the gas can simply be cut off when the cooking process is finished and the manifold can remain in the throat portion until again needed.

Although a carriage platform 62 and pylon 61 are shown in the gas version of the present invention, it is obvious that the same is not necessary to convert the improved grill means shown in FIGS. 1 through 3 to gas by simply sitting tank 65 which is there too, removing clean-out tray 46 and replacing the same with the manifold assembly idicated generally at 75 and including manifold 71, control 69 and control housing 70.

From the above it can be seen that the present invention provides a sophisticated grill means with a built in non-toxic ignitor, had means for readily removing ashes, evenly cooks the food placed therein without burning, uses very little charcoal during cooking, is aestheticaly attractive, can self extinguish unused charcoal, and is easy to clean both interiorly and exteriorly.

The present invention can, of course, be carried out in other specific ways than those herein set forth without departing from the spirit and essential characteristics of the invention. The presetn embodiments are, therefore, to be considered in all respects as illustrative and not restrictive and all changes coming within the meaning and equivalency range of the appended claims are intended to be embraced therein.

I claim:

1. A convertible improved charcoal ignition to gas grill means comprising: an ignition chamber having a bottom, a surrounding wall structure extending upwardly from said bottom, and an open top wherein said surronding wall structure slopes inwardly from said bottom to said open top; a grill chamber having a surrounding wall structure, an open bottom and an open top wherein said surrounding wall structure slopes outwardly from said open bottom to said open top; a collar extending between said open top of said ignition chamber and said open bottom of said grill chamber for supporting said grill chamber above said ignition chamber and for providing means for air to flow between said ignition chamber and grill chamber; basket type means disposed within said grill chamber for receiving and containing briquettes directly above said open bottom; means for supporting said basket type means within said grill chamber; a generally horizontal grill disposed within said grill chamber above said basket type means; means for supporting said grill with said grill chamber; a smoke cover movable between an open and closed position for closing said open top of said grill chamber; and a removable gas burner means; a removable ash pan; said gas burner means and such ash pan alternately insertable into said collar whereby a convertible grilling means is provided.

2. The means of claim 1 wherein said briquettes are of the charcoal type.

3. The means of claim 1 wherein said briquettes are of the stone type.

4. The means of claim 1 wherein said briquettes are of a combination charcoal and stone types.

5. The means of claim 1 wherein said burner means for replacing said ash pan includes an elongated manifold with a guide and support flange secured to one end thereof and a gas control and housing operatively secured to opposite end thereof.

6. The means of claim 5 wherein said housing includes a housing flange for at least partially supporting said burner assembly.

* * * * *